United States Patent
Cantley et al.

(10) Patent No.: US 10,474,332 B2
(45) Date of Patent: Nov. 12, 2019

(54) MULTI-USE RESOURCE INTERACTION PROJECTION SYSTEM

(71) Applicant: BANK OF AMERICA CORPORATION, Charlotte, NC (US)

(72) Inventors: Kerry Michelle Cantley, Fort Mill, SC (US); Shawn Cart Gunsolley, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/860,272

(22) Filed: Jan. 2, 2018

(65) Prior Publication Data
US 2019/0204999 A1    Jul. 4, 2019

(51) Int. Cl.
| | |
|---|---|
| G06F 17/00 | (2019.01) |
| G06F 3/0484 | (2013.01) |
| G06Q 20/10 | (2012.01) |
| G06F 3/0482 | (2013.01) |
| H04L 29/06 | (2006.01) |

(52) U.S. Cl.
CPC .......... *G06F 3/0484* (2013.01); *G06F 3/0482* (2013.01); *G06Q 20/1085* (2013.01); *H04L 63/08* (2013.01)

(58) Field of Classification Search
CPC ................................. G07F 19/20; G06F 21/31
See application file for complete search history.

(56) References Cited

U.S. PATENT DOCUMENTS

| | | |
|---|---|---|
| 7,249,080 B1 | 7/2007 | Hoffman et al. |
| 7,315,837 B2 | 1/2008 | Sloan et al. |
| 8,233,841 B2 | 7/2012 | Griffin et al. |
| 8,635,157 B2 | 1/2014 | Smith et al. |
| 8,909,933 B2 | 12/2014 | Pieczul et al. |
| 9,010,627 B1 | 4/2015 | Prasad et al. |
| 9,098,846 B2 | 8/2015 | Gill et al. |
| 9,344,279 B2 | 5/2016 | Pieczul et al. |
| 9,401,077 B2 | 7/2016 | Laracey |
| 9,412,106 B2 | 8/2016 | Laracey |
| 9,413,534 B2 | 8/2016 | Pieczul et al. |
| 9,697,505 B2 | 7/2017 | Hao et al. |
| 2008/0005037 A1 | 1/2008 | Hammad et al. |
| 2008/0194298 A1 | 8/2008 | Panabaker et al. |
| 2008/0208762 A1 | 8/2008 | Arthur et al. |
| 2009/0112766 A1 | 4/2009 | Hammad et al. |

(Continued)

*Primary Examiner* — Andrew T McIntosh
(74) *Attorney, Agent, or Firm* — Michael A. Springs; Moore & Van Allen PLLC; Nicholas C. Russell

(57) ABSTRACT

Embodiments of the present invention provide a system for projecting an interaction machine interface used for performing interactions onto a user device. The system is typically configured for receiving a trigger from a user device to access an interaction machine via a projection application, in response to receiving the trigger, authenticate the user device via a customized authentication method, determine that the authentication is successful and establish a communication link between the interaction machine and the user device, transmit control signals, via the projection application, to the user device to project the interaction machine display onto the user device, receive an interaction request from the user device via the interaction machine display and the projection application, and process the interaction request received from the user device.

17 Claims, 6 Drawing Sheets

(56) References Cited

U.S. PATENT DOCUMENTS

| | | |
|---|---|---|
| 2009/0210308 A1 | 8/2009 | Toomer et al. |
| 2010/0088188 A1 | 4/2010 | Kumar et al. |
| 2010/0280914 A1 | 11/2010 | Carlson |
| 2013/0097080 A1 | 4/2013 | Smets et al. |
| 2015/0178732 A1* | 6/2015 | Laracey ............. G06Q 20/1085 705/43 |
| 2016/0078416 A1* | 3/2016 | DeLuca ............. G06Q 20/1085 705/43 |
| 2016/0224809 A1 | 8/2016 | Pieczul et al. |

* cited by examiner

MULTI-USE RESOURCE INTERACTION PROJECTION SYSTEM

BACKGROUND

Present conventional systems do not allow users to perform interactions associated with distribution of resources on user devices. Typically, to perform interactions, a user has to go to a computer terminal provided by an entity and initiate the interactions associated with distribution of resources. Therefore there exists a need for a system to allow the users to perform interactions on user devices.

SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Embodiments of the present invention address the above needs and/or achieve other advantages by providing apparatuses (e.g., a system, a computer program product comprising computer program code stored on a non-transitory computer-readable medium which is readable by a computer, and/or other devices) and computer implemented methods for projecting an interaction machine interface used for performing interactions onto a user device, the system comprising a computer apparatus including a processor and a memory; and a module stored in the memory, comprising executable instructions that when executed by the processor cause the processor a computer apparatus including a processor and a memory; and a module stored in the memory, comprising executable instructions that when executed by the processor cause the processor to receive a trigger from a user device of a user to access an interaction machine via a projection application, in response to receiving the trigger, authenticate the user device via a customized authentication method, in response to successful authentication, establish a communication link between the interaction machine and the user device, transmit control signals to the user device, via the projection application, to project interaction machine display onto the user device, wherein the interaction machine display comprises one or more options to perform interactions, wherein the one or more options are displayed based on customizations saved in a user profile, receive an interaction request from the user device via the interaction machine display and the projection application, and process the interaction request received from the user device.

In some embodiments, the interaction machine is a dummy interaction machine, wherein the dummy interaction machine is accessed by a plurality of users simultaneously.

In some embodiments, the one or more processing devices are configured to execute the computer readable code to receive the customizations associated with display of the one or more options on the interaction machine display from the user device and store the customizations associated with display of the one or more options in the user profile associated with the user.

In some embodiments, the interaction request is associated with transfer of resources.

In some embodiments, the interaction request associated with withdrawal of resources.

In some embodiments, the one or more processing devices are configured to execute the computer readable code to receive a pick-up location associated with the withdrawal of resources, wherein the pick-up location is associated with the interaction machine or a third party entity device.

In some embodiments, the interaction machine is an Automated Teller Machine.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
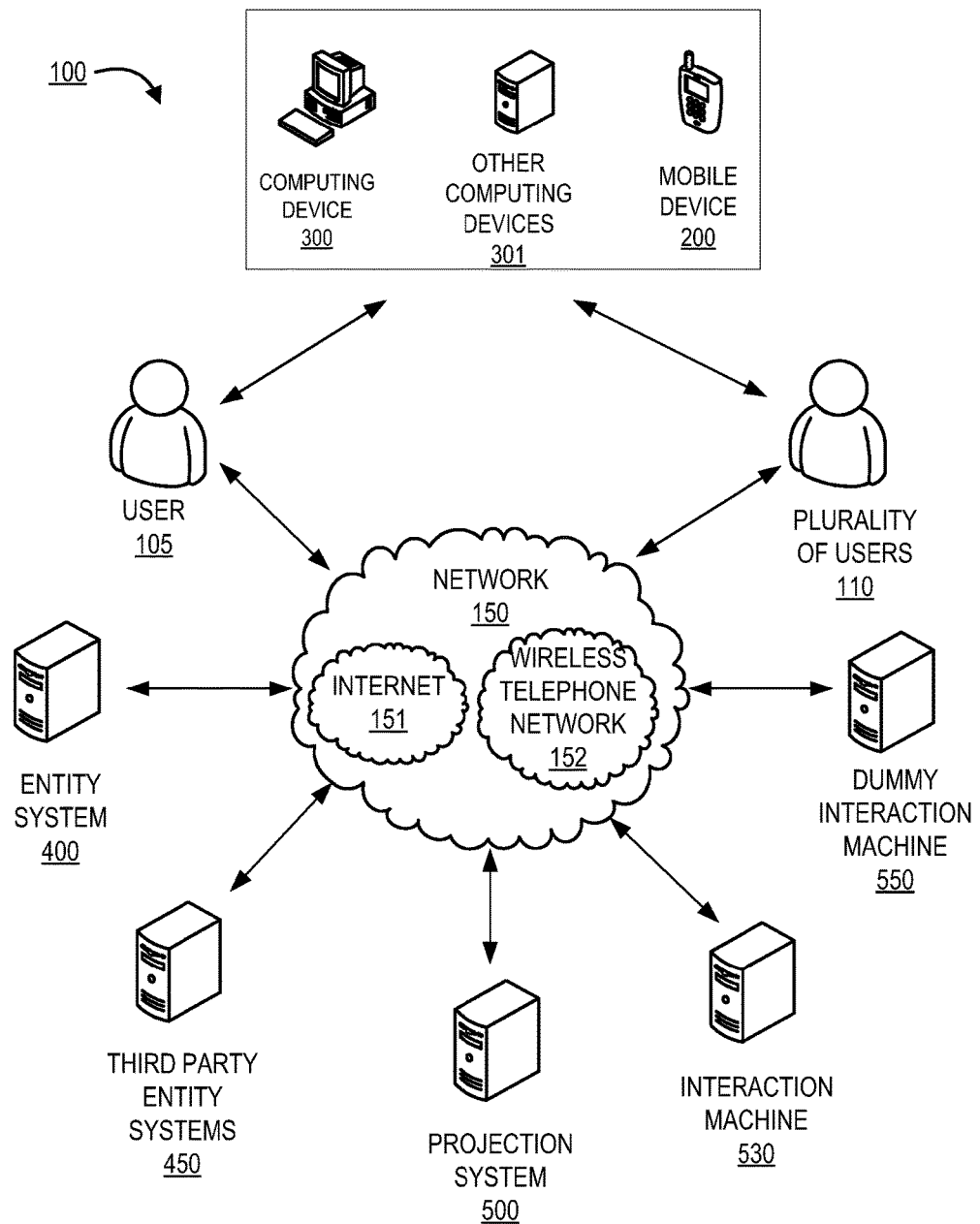
Figure 2:
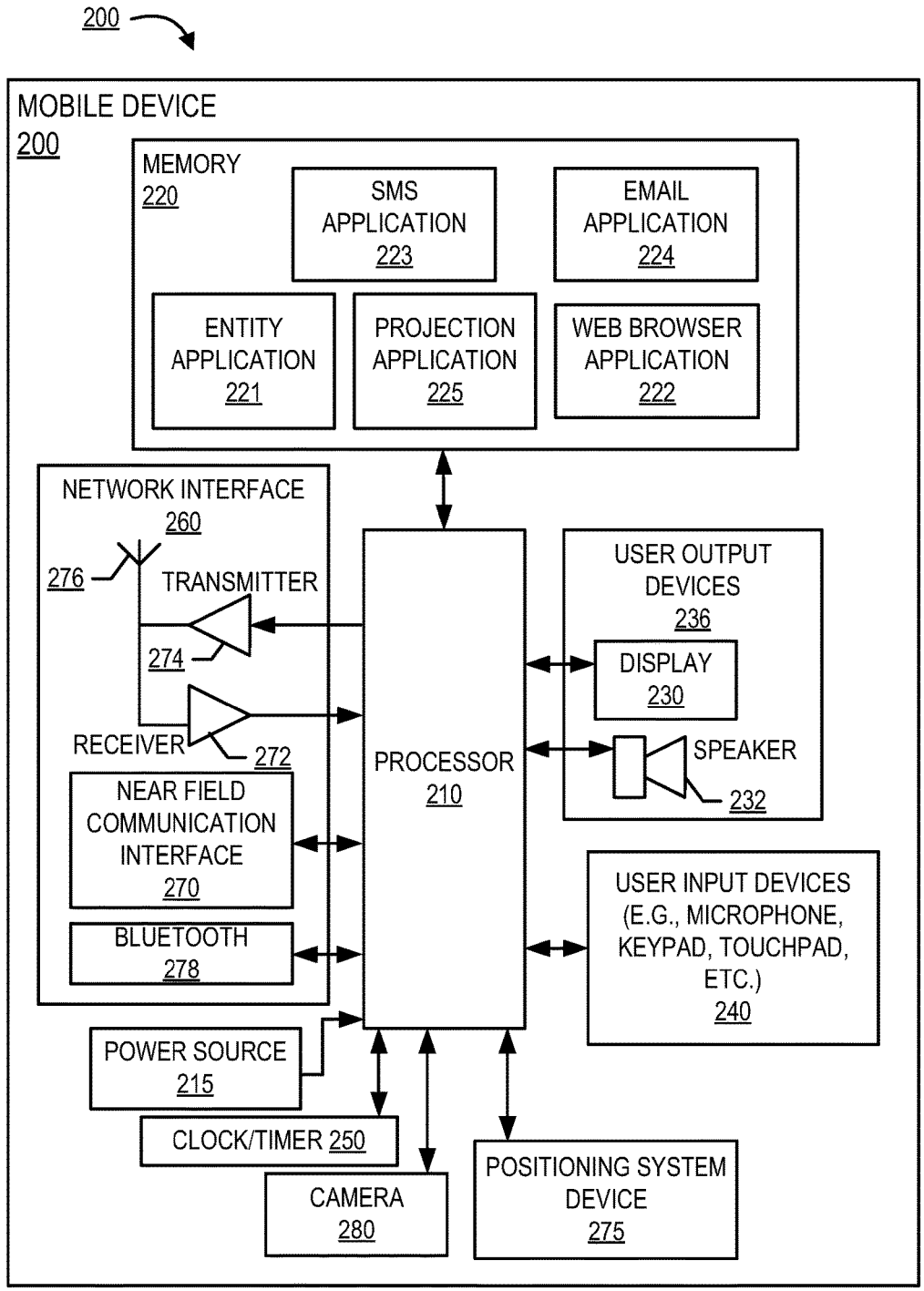
Figure 3:
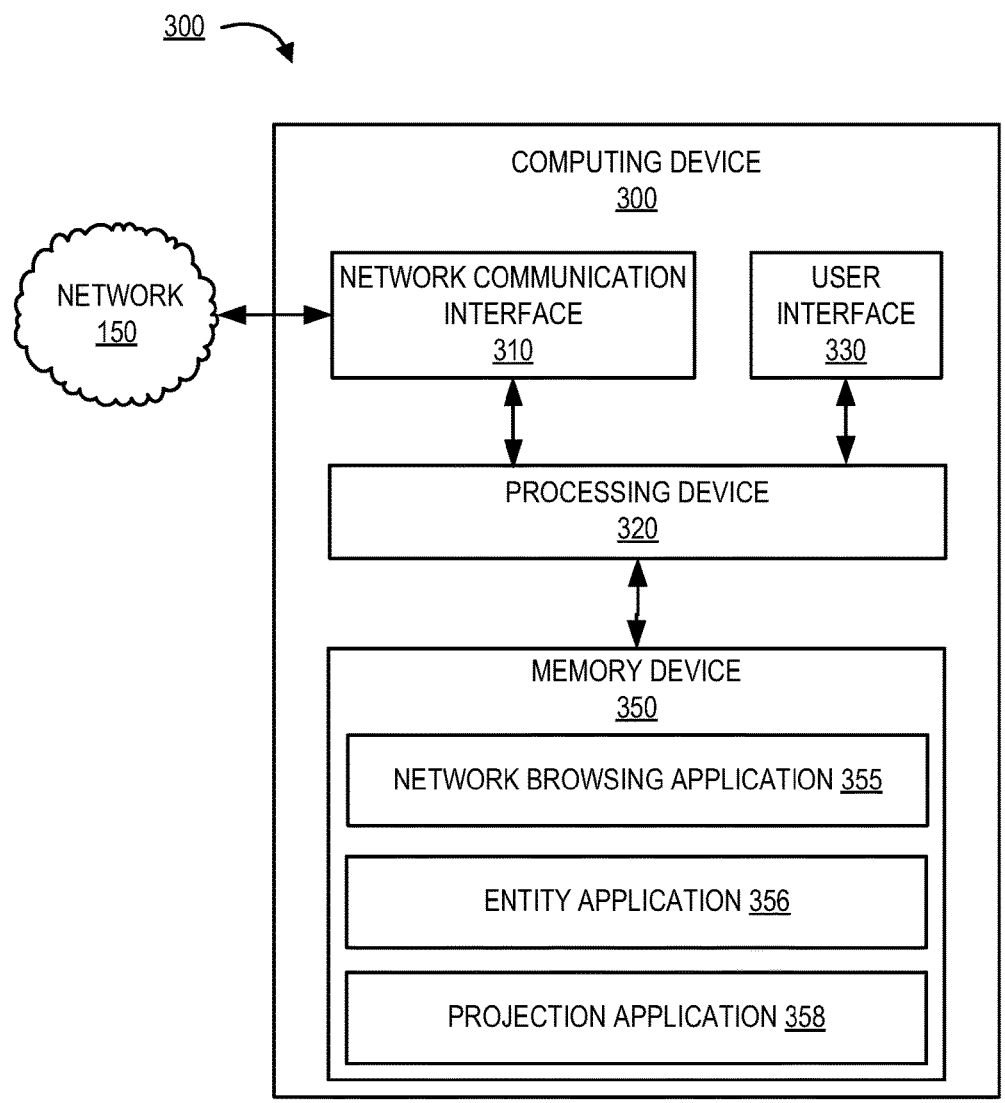
Figure 4:
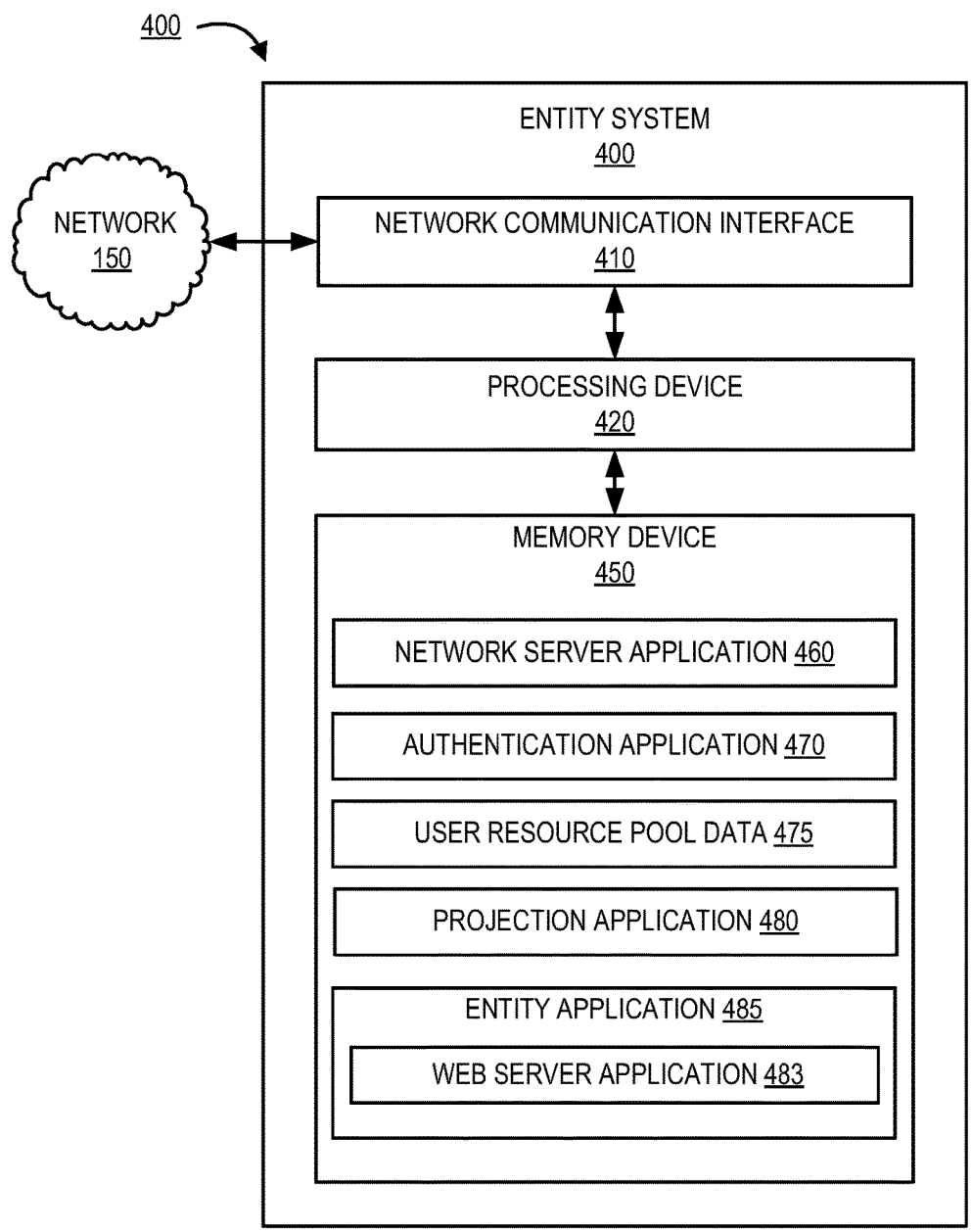
Figure 5:
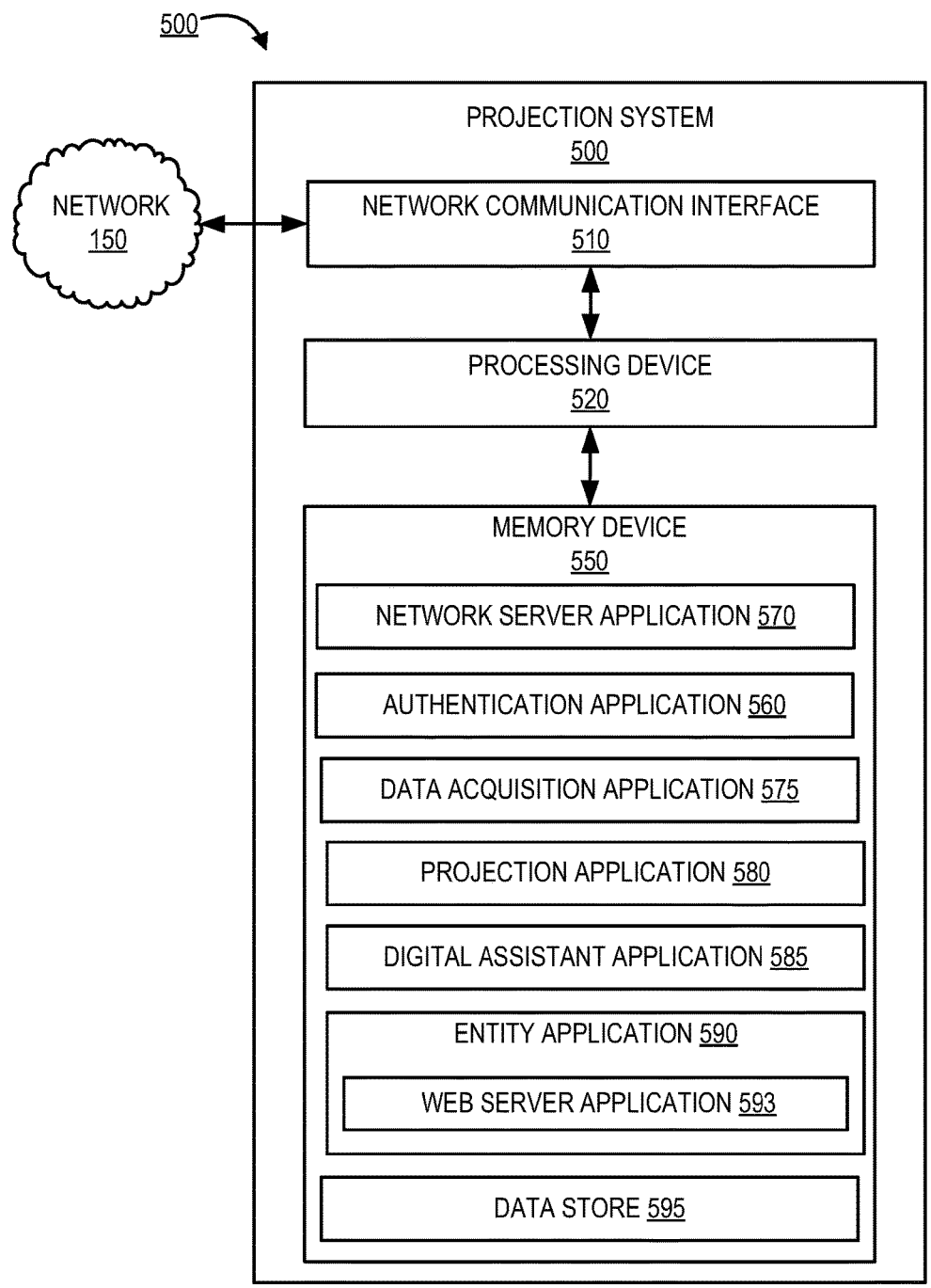
Figure 6:
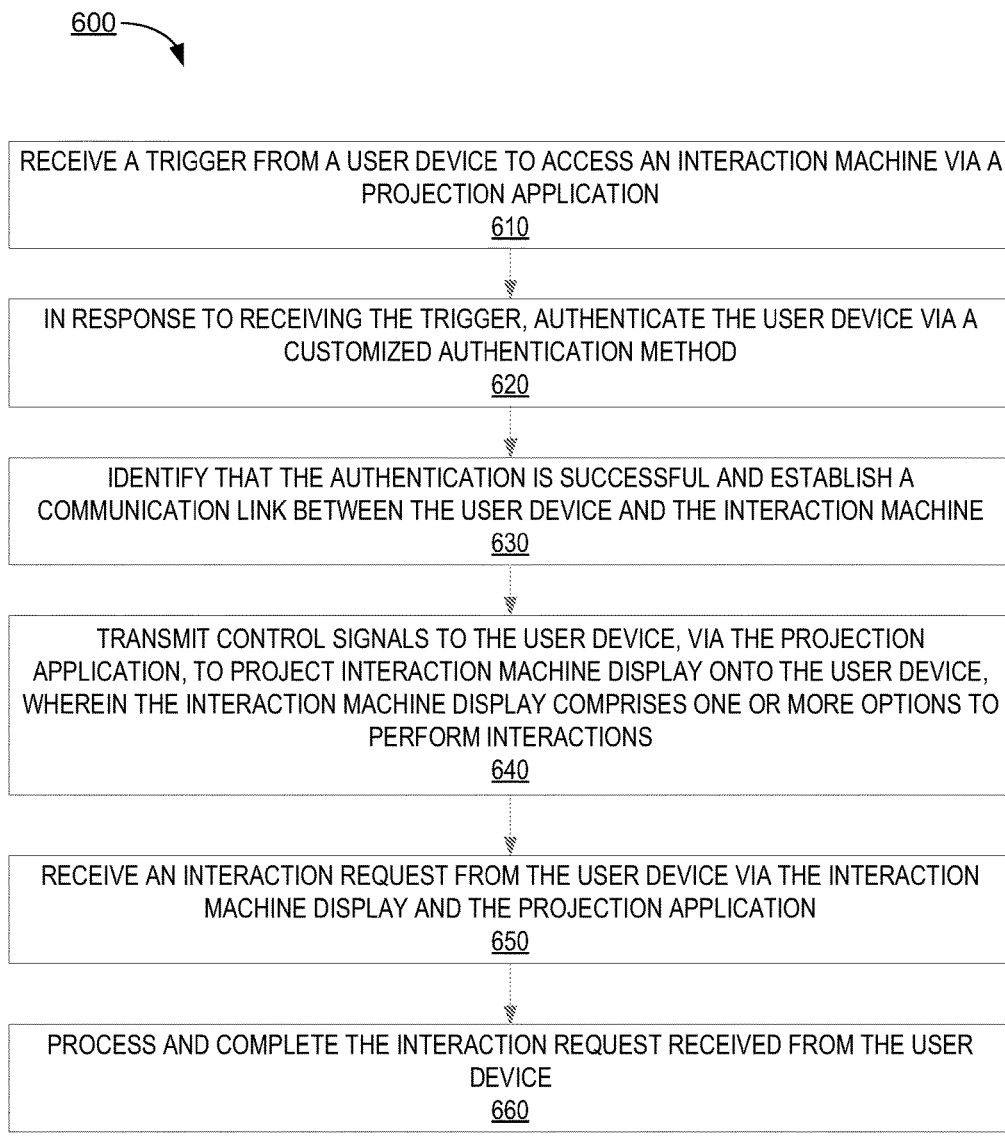

Having thus described some embodiments of the present invention in general terms, reference will now be made to the accompanying drawings, where:

FIG. 1 presents a projection system environment, in accordance with one embodiments of the present invention;

FIG. 2, presents a block diagram illustrating a mobile device of a user illustrated in FIG. 1, in accordance with embodiments of the present invention;

FIG. 3 presents a block diagram illustrating a computing device of a user illustrated in FIG. 1, in accordance with embodiments of the present invention;

FIG. 4 presents a block diagram illustrating the entity system(s) of FIG. 1, in accordance with embodiments of the present invention;

FIG. 5 presents a block diagram illustrating the projection system of FIG. 1, in accordance with embodiments of the present invention; and FIG. 6 presents a process flow for projecting an interaction machine interface onto a user device to facilitate processing of one or more interactions via the mobile device, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" may include any organization that processes financial transactions including, but not limited to, banks, credit unions, savings and loan associations, investment companies, stock brokerages, asset management firms, insurance companies and the like. Furthermore, embodiments of the present invention use the term "user" or "customer." It will be appreciated by someone with ordinary skill in the art that the user or customer may be a customer of the financial institution or a potential customer of the financial institution or an employee of the financial institution. In accordance with embodiments of the invention, the terms "third party system" and "other third party systems" may include any organizations including, but not limited to, any retail organizations, or any other entities that offer products and services to customers, and/or the like.

In accordance with embodiments of the invention, a "resource pool" or an "account" is the relationship that a customer has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user profile that includes information associated with the user, or the like. The account is associated with and/or maintained by the entity. In accordance with embodiments of the present invention, an "interaction terminal" or "interaction machine" is an Automated Teller Machine (ATM) used to perform interactions. In accordance with embodiments of the present invention, a "dummy interaction machine" may be any remote Automated Teller Machine that can be accessed by any number of users simultaneously to perform interactions.

In accordance with embodiments of the invention, an "interaction" may be a transaction, transfer of funds, transfer of resources, and may refer to any activities or communication between a user and an entity, between an entity and a third party system, activities or communication between multiple entities, communication between technology application and the like. Transfer of resources may refer to a payment, processing of funds, international transfer of funds, payment transaction, a credit transaction, or other interactions involving user's resource or account. Unless specifically limited by the context, a "transaction", a "transfer of funds", a "record" may refer to any activity initiated between a user and a resource entity or a third party system, or any combination thereof. Typical financial transactions, in the present invention include any type of automated teller machine (ATM) transactions.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

Present conventional systems do not allow users to perform interactions on a user device. Typically, a user has to go to an interaction machine to perform one or more interactions and interaction machines may not be available at every location making it difficult for the users to perform interactions. Additionally, performing interactions directly on an interaction machine may not always be secure. After initiating and completing an interaction, a user may seek services of a digital assistant for which the user has to stay at the interaction machine to complete the conversation with the digital assistant. Moreover, building, installation, and maintenance of interaction machines can be a costly process. Therefore, there exists a need for a system which allows the user to overcome these technical problems. The present invention eliminates the need for the user to typically go to an interaction machine to perform interactions, allows the users to perform interactions via a user device, and also allows the user to utilize existing interaction machines to perform interactions in a secure manner. The system projects an interaction machine display onto a user device and facilitates processing of one or more interactions via a user device.

Furthermore, the invention allows for quick updating of software and hardware. Typically, updating interaction machines requires significant backend updating of hardware, software, and the like. Furthermore, the machines may need to be physically updated at the location. Using the projection application, this invention may provide quick and efficient updates to all of the interaction machines instantaneously.

In some embodiments, utilization of the projection application drives down opportunity costs of typical ATM machines or the like by elimination of exception processing by allowing for confirmation and clearance of deposits via specific location or user device to prevent exceptions in the processing of the deposit.

FIG. 1 provides a block diagram illustrating an environment 100 for a projection system. As depicted in the embodiment of FIG. 1, the operating environment 100 may include a projection system 500 interacting with an entity system 400, third party entity systems 450, interaction machine 530, dummy interaction machine 550, a user 105, a plurality of users 110, using a network 150. In some embodiments, the projection system 500 may be maintained by the entity. In some embodiments, the projection system 500 may be a part of the entity system 400. In some embodiments, the interaction machine may be owned by the entity and maintained by a third party. In some embodiments, the dummy interaction machine 550 may be owned and maintained by an entity at a remote location and within any facility owned by the entity. In some embodiments, the user 105 may be customer of the entity. In some embodiments, the projection system 500 may interact simultaneously with a plurality of users and a plurality of interaction machines 530 and dummy interaction machine 550. The projection system 500 communicates with all the systems and users as shown in environment 100 via the network 150 to process one or more interactions initiated by the user on any of a plurality of user devices.

The environment 100 also may include the plurality of user devices. The user devices may include any machine, apparatus, system or the like that may be connected to and communicate with other devices over a network 150. At least one of the devices may include a computing device 300, other computing devices 301, and a mobile device 200 for use by the user 105 and the plurality of users 110. The computing devices 301 may be any device that employs a processor and memory and can perform computing functions, such as a computing device 300 or a mobile device 200, that may be connected to or access the network 150. The computing device 300 may include a personal computer such as a desktop computer, laptop computer, tablet or any type of computing device that may be connected to a network by landline or wireless access such as wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. As used herein, the mobile device 200 may include any mobile communication device, such as a cellular telecommunications device (i.e., a cell phone or mobile phone), personal digital assistant (PDA), a mobile Internet accessing device, tablet computer, or other mobile device. A mobile device may connect to the network by a cellular telecommunications network or by Wi-Fi, Bluetooth or other access technology.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone and the embodiment of the mobile device 200 shown in FIG. 2 are merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, tablets, mobile televisions, gaming devices, laptop computers, cameras, video recorders, audio/video player, radio, Global Positioning Systems (GPS) devices, or any combination of the aforementioned. In some embodiments, the mobile device may be a wearable device.

Some embodiments of the mobile device 200 include a processor 210 communicably coupled to such devices as a memory 220, user output devices 236, user input devices 240, and a network interface 260. The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices. The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like. The memory device 220 may include other applications such as entity application 221, projection application 225, e-mail application 224 and SMS application 223. The entity application 221 may be an application provided by the entity system 400 which allows the user to access information associated with one or more resource pools. The projection application 225 may be an application provided by the entity system 400 and/or the projection system 500 which allows the user to interact with one or more interaction machines 530 and dummy interaction machine 550 to perform one or more interactions.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks.

The network interface 260 may also include a near field communication (NFC) interface 270. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 270 may include a smart card, key card, proximity card, Bluetooth® device, radio frequency identification (RFID) tag and/or reader, transmitter, receiver, and/or the like. In some embodiments, the NFC interface 270 communicates information via radio, infrared (IR), and/or optical transmissions. In some embodiments, the NFC interface 270 is configured to operate as an NFC transmitter and/or as an NFC receiver (e.g., an NFC reader). Also, it will be understood that the NFC interface 270 may be embedded, built, carried, and/or otherwise supported in and/or on the mobile device 200. In some embodiments, the NFC interface 270 is not supported in and/or on the mobile device 200, but the NFC interface 270 is otherwise operatively connected to the mobile device 200 (e.g., where the NFC interface 270 is a peripheral device plugged into the mobile device 200). Other apparatuses having NFC interfaces mentioned herein may be configured similarly. In some embodiments, the NFC interface 270 of the mobile device 200 is configured to contactlessly and/or wirelessly communicate information to and/or from a corresponding NFC interface of another apparatus (e.g., a wearable device or another mobile or computing device or an interaction machine). Additionally, the mobile device may include a Bluetooth 278 which allows the user to communicate with an interaction machine 530 when the user within a proximate distance from the interaction machine 530.

As described above, the mobile device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to transmit data, may include any of a number of devices allowing the mobile device 200 to transmit data, such as a keypad, keyboard, touch-screen, touchpad, microphone, mouse, joystick, other pointer device, button, soft key, and/or other input device(s). The user interface may also include a camera 280, such as a digital camera.

The mobile device 200 may also include a positioning system device 275 that is configured to be used by a positioning system to determine a location of the mobile device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the mobile device 200. In other embodiments, the positioning system device 275 includes a proximity sensor or transmitter, such as an RFID tag, that can sense or be sensed by devices known to be located proximate a location to determine that the mobile device 200 is located proximate these known devices.

The memory 220 is operatively coupled to the processor 210. As used herein, "memory" or "memory device" includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which include computer-executable instructions/code executed by the processor 210 to implement the functions of the mobile device 200 and/or one or more of the process/method steps described herein. The memory 220 includes an entity application 221 that may be used to allow communication with an entity system such as the entity system 400 to implement the system of the invention. The use of the entity application 221 may facilitate access to the system of the invention by providing log-in systems including user authentication systems, account information, system controls or the like. The memory 220 includes a projection application 225 that may be used to communicate with the projection system 500. The entity application 221 and projection application 225 communicate with the projection system 500 and the entity system 400 to allow the user to set up and/or control the system of the invention. In some embodiments, the entity application 221 and projection application 225 are part of a single application. For example, the entity application 221 may be an online banking application and the projection application 225 may be a module in the online banking application. In some embodiments, wherein the user is a new customer or a first time user of the entity application 221 and when the user installs the entity application 221, the projection application 225 is automatically embedded within the entity application 221.

These applications also typically provide a graphical user interface (GUI) on the display 230 that allows the user 105 to communicate with the mobile device 200, the entity system 400, the projection system 500, the interaction machine 530, dummy interaction machine 550, and/or other devices or systems. The memory 220 can also store any of a number of pieces of information, and data, used by the mobile device 200 and the applications and devices that make up the mobile device 200 or are in communication with the mobile device 200 to implement the functions of the mobile device 200 and/or the other systems described herein. For example, the memory 220 may include such data as user authentication information. In some embodiments, the memory 220 may include a digital wallet application which may have information associated with the one or more resource pools of the user. The projection application 225 may automatically use this data along with the other authentication information stored in the memory to authenticate the user to the projection system 500 and allow the user to perform one or more interactions by communicating with the interaction machine 530 and dummy interaction machine 550.

Referring now to FIG. 3, the computing device 300 also includes various features, such as a network communication interface 310, a processing device 320, a user interface 330, and a memory device 350. The network communication interface 310 includes a device that allows the computing device 300 to communicate over the network 150 (shown in FIG. 1). In one embodiment of the invention, a network browsing application 355 provides for a user to establish network communication with an entity system 400 and projection system 500.

As used herein, a "processor" or "processing device," such as the processing device 320, generally refers to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in memory device 350. As the phrase is used herein, a processor or processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" generally includes a plurality of interface devices and/or software that allow a customer to input commands and data to direct the processing device to execute instructions. For example, the user interface 330 presented in FIG. 3 may include a graphical user interface (GUI) or an interface to input computer-executable instructions that direct the processing device 320 to carry out specific functions. In one exemplary embodiment of the present invention, the graphical user interface may be used by the projection system 500 to project the interaction machine display onto the computing device 300. The user 105 may perform interactions by using one or more options on the interaction machine display without actually having to be physically present at the interaction machine or the dummy interaction machine. The user interface 330 employs certain input and output devices as previously described with reference to FIGS. 1 and 2. These input and output devices may include a display, mouse, keyboard, button, touchpad, touch screen, microphone, speaker, LED, light, joystick, switch, buzzer, bell, and/or other user input/output device for communicating with the entity system 400 and the projection system 500.

As used herein, a "memory" or "memory device" generally refers to a device or combination of devices that store one or more forms of computer-readable media for storing data and/or computer-executable program code/instructions. Computer-readable media is defined in greater detail below. For example, in one embodiment, the memory device 350 includes any computer memory that provides an actual or virtual space to temporarily or permanently store data and/or commands provided to the processing device 320 when it carries out its functions described herein. The memory device 350 may include such applications as a conventional network browsing application 355, an entity application 356, a projection application 358 and/or the like. The entity application 356 may be used to allow communication with an entity system, such as the entity system 400. projection application 358 may be used to allow communication with the projection system 500 and the entity system 400 to implement one or more actions. The other computing devices 301 as shown in FIG. 1 may include similar system blocks as the computing device 300.

FIG. 4 provides a block diagram illustrating the entity system 400, in greater detail, in accordance with embodiments of the invention. As illustrated in FIG. 4, in one embodiment of the invention, the entity system 400 includes one or more processing devices 420 operatively coupled to a network communication interface 410 and a memory device 450. In certain embodiments, the entity system 400 is operated by an entity, such as a financial institution.

It should be understood that the memory device 450 may include one or more databases or other data structures/repositories. In one embodiments of the present invention, the memory device 450 includes data stores comprising information about one or more resource pools associated with a plurality of users associated with the entity. The memory device 450 also includes computer-executable program code that instructs the processing device 420 to operate the network communication interface 410 to perform certain communication functions of the entity system 400 described herein. For example, in one embodiment of the entity system 400, the memory device 450 includes, but is not limited to, a network server application 460, an authentication application 470, user resource pool data 475, a projection application 480, an entity application 485 including a mobile web server application 483, and other computer-executable instructions or other data. The computer-executable program code of the network server application 460, the authentication application 470, projection application 480, or the entity application 485 may instruct the processing device 420 to perform certain logic, data-processing, and data-storing functions of the entity system 400 described herein, as well as communication functions of the entity system 400. The entity application 485 communicates with the user devices to facilitate communication between the user and the entity. The entity application 485 may be a mobile banking application. In one embodiment, the projection application 480 may be a part of the entity application 485.

In one embodiment, the network server application 460, the authentication application 470, and the entity application 485 are configured to invoke or use the customer authentication data stored in the memory when authenticating a user to the entity system 400. In some embodiments, the projection application 480 allows communication with the projection system 500. The user resource pool data 475 comprises information of all resource pools of a plurality of users associated with the entity managing the entity system 400.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as the mobile device 200, the computing device 300, other computing devices 301, and projection system 500. The processing device 420 is configured to use the network communication interface 410 to transmit and/or receive data and/or commands to and/or from the other devices connected to the network 150.

FIG. 5 presents a block diagram illustrating the projection system 500, in accordance with embodiments of the invention. As illustrated in FIG. 4, in one embodiment of the invention, the projection system 500 includes one or more processing devices 520 operatively coupled to a network communication interface 510 and a memory device 550. In certain embodiments, the projection system 500 is operated by an entity, such as a financial institution.

It should be understood that the memory device 550 may include one or more databases or other data structures/repositories. The memory device 550 also includes computer-executable program code that instructs the processing device 520 to operate the network communication interface 510 to perform certain communication functions of the projection system 500 described herein. For example, in one embodiment of the projection system 500, the memory device 550 includes, but is not limited to, a network server application 570, an authentication application 560, a data acquisition application 575, a projection application 580, a digital assistant application 585, a data store 595 and an entity application 590 including a web server application 593, and other computer-executable instructions or other data. The computer-executable program code of the network server application 570, the authentication application 560, the data acquisition application 575, the projection application 580, the digital assistant application 585, the entity application 590, or the web server application 593 may instruct the processing device 520 to perform certain logic, data-processing, and data-storing functions of the projection system 500 described herein, as well as communication functions of the projection system 500. In some embodiments, the entity application 590 and the projection application 580 may be part of the same application. The data acquisition application 575 communicates with the entity system 400 via the entity application 590 to extract resource pool data associated with a plurality of users. Additionally, the data acquisition application 575 may extract authentication information associated with the resource pools of the user. The projection application 580 or the entity application 590 communicate with the entity application 221 or the projection application 225 in the mobile device 200 and entity application 356 or projection application 358 in the computing device 300 to facilitate one or more steps in the process flows described herein. The digital assistant application 585 is an intelligence engine which provides information associated with one or more services associated with the entity system 400 and the projection system 500. The data store 595 may comprise user profiles which include data associated with screen customizations or display customizations associated with a plurality of users 110 and the user 105. The screen or display customizations are arrangement of one or more options associated with the interaction machine display which is projected on the user device. For example, the user may customize the arrange the one or more options according to his/her preferences and may submit it to the system. The system 500 extracts this information every time a user accesses or logs in to the projection application 225 to perform one or more interactions and projects the saved customizations associated with the interaction machine display onto the mobile device 200.

As used herein, a "communication interface" generally includes a modem, server, transceiver, and/or other device for communicating with other devices on a network. The network communication interface 510 is a communication interface having one or more communication devices configured to communicate with one or more other devices on the network 150, such as the interaction machine 530, dummy interaction machine 550, entity system 400, third party entity systems 450, mobile device 200, the computing device 300, and/or other computing devices 301. The processing device 520 is configured to use the network communication interface 510 to transmit and/or receive data and/or commands to and/or from the other devices connected to the network 150.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 550 includes any computer memory that provides an actual or virtual space to temporarily or permanently store data and/or commands provided to the processing device 520 when it carries out its functions described herein.

The interaction machine 530 is an Automated Teller Machine used to perform interactions and may comprise processing devices, a network communication interface including NFC and a Bluetooth, a memory, and input and output devices including keypad, mouse, keyboard, button, touchpad, touch screen, microphone, speaker, LED, light, joystick, switch, buzzer, bell, and/or the like, a cash dispenser, deposit slot, card reader, receipt printer and/or the like. The user may access the interaction machine display via the projection application 225 on his/her mobile device and perform interactions including making payments, withdrawal of cash, deposit of check, and/or the like using the one or more options present on the interaction machine display. After initiating and/or the completing the interaction, the user may physically interact with the interaction machine to take cash from the cash dispenser or receipt from the receipt printer and to deposit check or cash using the deposit slot. This allows the user to securely perform one or more interactions and also allows the user to initiate one or more interactions before reaching the interaction machine. For example, the user may be in a retail store which is located few feet away from the interaction machine and the user may communicate with the interaction machine, via the projection application, to initiate withdrawal of resources. Additionally, the user may choose to pick-up the resources in the retail store or at the interaction machine at a specific time. The projection system 500 facilitates communication between the mobile device 200 and the interaction machine 530.

The dummy interaction machine 550 is a remote Automated Teller Machine located in any of the facilities associated with the entity. The dummy interaction machine 550 comprises at least a processing device, network communication interface, and a memory device. The projection system 500 allows a user to access the dummy interaction machine 550 from any location to perform one or more interactions including making payments, withdrawal of cash, deposit of check, and/or the like without having to be physically present at the dummy interaction machine 550 or the interaction machine 530. The process of performing interactions via the projection system is explained in greater detail below.

FIG. 6 presents a process flow 600 for projecting an interaction machine interface onto a user device to facilitate processing of one or more interactions via the mobile device, in accordance with embodiments of the present invention. As shown in block 610, the system receives a trigger from a user device to access an interaction machine via the projection application on the user device. For example, as soon as the user opens the projection application 225 or the projection application 358 from the mobile device 200 or the computing device 300, the projection application automatically transmits a trigger to the projection system 500. In some embodiments, the interaction machine may be an actual Automated Teller Machine. In some embodiments, the interaction machine may be the dummy interaction machine 550. In some embodiments, the user may choose either an interaction machine option 530 or the dummy interaction machine option 550 after accessing the projection application based on the proximity to the actual interaction machine 530. In alternate embodiments, in response to receiving the trigger from the user device, the system automatically identifies the location of the user and determines all available interaction machines within a predetermine distance and displays the available interaction machines to the user via the projection application. The user may either select any of the available interaction machines or may choose to use the dummy interaction machine based on the proximity to the available interaction machines.

Next, as shown in block 620, the system in response to receiving the trigger, authenticates the user device via a customized authentication method. The user may set up a customized authentication method after installing the projection application on the user device. Every time the user accesses the projection application, the projection system authenticates the user via the customized authentication method stored in a profile associated with the user. The authentication methods may include any of the available authentication methods and the system allows the user to customize the authentication methods used while accessing an actual interaction terminal and a dummy interaction terminal. For example, the user may choose Bluetooth authentication or NFC authentication for accessing a dummy interaction machine 550 and a unique device authentication for accessing an interaction machine 530. The system may identify the type of interaction machine the user is trying to access and authenticate the user device using the associated customized authentication method. As shown in block 630, the system identifies that the authentication is successful and establishes a communication link between the user device and the interaction machine.

As shown in block 640, the system transmits control signals to the user device, via the projection application, to project interaction machine display onto the user device, wherein the interaction machine display comprises one or more options to perform interactions, wherein the one or more options are displayed based on customizations saved in a user profile. The one or more options may include deposit, withdrawal, transfer of resources, and/or the like. The system may receive the customizations associated with the display of the one or more options on the interaction machine display, via the projection application. In response to receiving the customizations from the user, the system stores the customizations associated with the display of the one or more options in the user profile associated with the user. For example, the user may choose to perform only withdrawal of resources using the projection application and the user may customize the interaction machine display to show only the option of withdrawal of resources while projecting the interaction machine display onto the user device.

In some embodiments, the user may be an individual user or a large third party entity. In an embodiment, wherein the user is a large third party entity with a plurality of employees, there may be multiple employee profiles associated with the profile of the large third party entity and each of the employee profiles may have customizations associated with the display of the one or more options. For example, Employee 'A' may have authorization only to deposit resources and Employee 'B' may have authorization only to withdraw resources. Based on the employee id, the system may project the interaction machine display with associated customizations linked with an employee profile. Additionally, having individual profiles for a plurality of employees under the profile of the large third party entity allows the system and the third party entity to track interactions.

As shown in block 650, the system receives an interaction request from the user device via the interaction machine display and the projection application. For example, the system after establishing a communication link between the user device and the dummy interaction machine, may receive an interaction request associated with withdrawal of resources via the interaction machine display projected onto the mobile device. In other words, the user may select the option "withdrawal" from the one or more options present on the interaction machine display and submit it to the system via the projection application. In some embodiments, the system may receive specific instructions associated with the withdrawal of resources. Specific instructions may include a pick-up location associated with the withdrawal of resources. For example, the user may initiate the interaction associated with withdrawal of resources and may choose an alternate location such as a third party entity location to pick-up the resources.

As shown in block 660, the system processes and completes the interaction request received from the user device. In an exemplary embodiment, wherein the interaction is transfer of resources, the system processes the interaction request and transfers the resources from the designated resource pool of the user to the recipient. In another exemplary embodiment, wherein the interaction is withdrawal of resources, the system identifies a pick-up location associated with the withdrawal of resources. In one example, wherein the pick-up location is a third party entity location, the system communicates with a third party entity system associated with the pick-up location and transfers the resources from resource pool of the user to the third party entity system. In response to transferring the resources to the third party entity system, the system generates a code such as a QR code and displays it on the projected interaction terminal display. The user presents the QR code to third party system and collects the resources associated with the interaction. In another example, wherein the pick-up location is an interaction machine and the system may generate a QR code associated with the interaction request and display it on the interaction machine display projected onto the mobile device. The user may scan the QR code at the pick-up location to collect the resources associated with the interaction. The system allows a user to perform multiple interactions in one session and simultaneously communicates and processes interaction requests received from the plurality of users. The system may also communicate with other financial institution servers to process interaction requests associated with resource pools managed by the other institution servers. For example, a user who may or may not be a customer of the entity, may own accounts which are managed by other financial institutions. The system facilitates processing of interaction requests associated with the accounts which are managed by other financial institutions.

Using the invention allows for quick updating of software and hardware. Typically, updating interaction machines requires significant backend updating of hardware, software, and the like. Furthermore, the machines may need to be physically updated at the location. Using the projection application, this invention may provide quick and efficient updates to all of the interaction machines instantaneously. Furthermore utilization of the projection application drives down opportunity costs of typical ATM machines or the like by elimination of exception processing by allowing for confirmation and clearance of deposits via specific location or user device to prevent exceptions in the processing of the deposit.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for projecting an interaction machine interface used for performing interactions onto a user device, the system comprising:
one or more memory devices having computer readable code stored thereon;
one or more processing devices operatively coupled to the one or more memory devices, wherein the one or more processing devices are configured to execute the computer readable code to:
receive a trigger from a user device of a user to access a remote interaction machine via a projection application, wherein the remote interaction machine is accessed by a plurality of users simultaneously via the projection application installed on a plurality of user devices associated with the plurality of users;
in response to receiving the trigger, authenticate the user device via a customized authentication method;
in response to successful authentication, establish a communication link between the remote interaction machine and the user device;
transmit control signals to the user device, via the projection application, to project a remote interaction machine display onto the user device, wherein the remote interaction machine display comprises one or more options to perform interactions, wherein the one or more options are displayed based on customizations saved in a user profile;
receive an interaction request from the user device via the remote interaction machine display and the projection application, wherein the interaction request is associated with withdrawal of resources;

receive, from the user device, a pick-up location associated with the withdrawal of the resources, wherein the pick-up location is associated with a first interaction machine, wherein the first interaction machine is different from the remote interaction machine;

process the interaction request received from the user device; and in response to processing the interaction request, generate a QR code and display it on the remote interaction machine display, wherein the QR code is scannable at the first interaction machine for collecting the resources associated with the interaction request.

2. The system of claim 1, wherein the one or more processing devices are configured to execute the computer readable code to:

receive the customizations associated with display of the one or more options on the remote interaction machine display from the user device; and store the customizations associated with display of the one or more options in the user profile associated with the user.

3. The system of claim 1, wherein the one or more processing devices are configured to execute the computer readable code to:

in response to receiving the pick-up location, initiate transfer of the resources from a resource pool of the user to a third party entity system associated with the pick-up location.

4. The system of claim 1, wherein the remote interaction machine is a remote Automated Teller Machine.

5. The system of claim 1, wherein the pick-up location is a retail store.

6. The system of claim 1, wherein the pick-up location is a third party entity location.

7. A computer program product for projecting an interaction machine interface used for performing interactions onto a user device, the computer program product comprising at least one non-transitory computer readable medium comprises computer readable instructions for:

receiving a trigger from a user device of a user to access a remote interaction machine via a projection application, wherein the remote interaction machine is accessed by a plurality of users simultaneously via the projection application installed on a plurality of user devices associated with the plurality of users;

in response to receiving the trigger, authenticating the user device via a customized authentication method;

in response to successful authentication, establishing a communication link between the remote interaction machine and the user device;

transmitting control signals to the user device, via the projection application, to project a remote interaction machine display onto the user device, wherein the remote interaction machine display comprises one or more options to perform interactions, wherein the one or more options are displayed based on customizations saved in a user profile;

receiving an interaction request from the user device via the remote interaction machine display and the projection application, wherein the interaction request is associated with withdrawal of resources;

receiving, from the user device, a pick-up location associated with the withdrawal of the resources, wherein the pick-up location is associated with a first interaction machine, wherein the first interaction machine is different from the remote interaction machine;

processing the interaction request received from the user device; and in response to processing the interaction request, generating a QR code and display it on the remote interaction machine display, wherein the QR code is scannable at the first interaction machine for collecting the resources associated with the interaction request.

8. The computer program product of claim 7, wherein the computer program product comprising the at least one non-transitory computer readable medium further comprises computer readable instructions for:

receiving the customizations associated with display of the one or more options on the remote interaction machine display from the user device; and storing the customizations associated with display of the one or more options in the user profile associated with the user.

9. The computer program product of claim 7, wherein the computer program product comprising the at least one non-transitory computer readable medium further comprises computer readable instructions for:

in response to receiving the pick-up location, initiating transfer of the resources from a resource pool of the user to a third party entity system associated with the pick-up location.

10. The computer program product of claim 7, wherein the remote interaction machine is a remote Automated Teller Machine.

11. The computer program product of claim 7, wherein the pick-up location is a retail store.

12. The computer program product of claim 7, wherein the pick-up location is a third party entity location.

13. A computer implemented method for projecting an interaction machine interface used for performing interactions onto a user device, the method comprises:

receiving a trigger from a user device of a user to access a remote interaction machine via a projection application, wherein the remote interaction machine is accessed by a plurality of users simultaneously via the projection application installed on a plurality of user devices associated with the plurality of users;

in response to receiving the trigger, authenticating the user device via a customized authentication method;

in response to successful authentication, establishing a communication link between the remote interaction machine and the user device;

transmitting control signals to the user device, via the projection application, to project a remote interaction machine display onto the user device, wherein the remote interaction machine display comprises one or more options to perform interactions, wherein the one or more options are displayed based on customizations saved in a user profile;

receiving an interaction request from the user device via the remote interaction machine display and the projection application, wherein the interaction request is associated with withdrawal of resources;

receiving, from the user device, a pick-up location associated with the withdrawal of the resources, wherein the pick-up location is associated with a first interaction machine, wherein the first interaction machine is different from the remote interaction machine;

processing the interaction request received from the user device; and in response to processing the interaction request, generating a QR code and display it on the remote interaction machine display, wherein the QR code is scannable at the first interaction machine for collecting the resources associated with the interaction request.

14. The computer implemented method of claim 13, wherein the computer implemented method further comprises:
   receiving the customizations associated with display of the one or more options on the remote interaction machine display from the user device; and
   storing the customizations associated with display of the one or more options in the user profile associated with the user.

15. The computer implemented method of claim 13, wherein the computer implemented method further comprises:
   in response to receiving the pick-up location, initiating transfer of the resources from a resource pool of the user to a third party entity system associated with the pick-up location device.

16. The computer implemented method of claim 13, wherein the pick-up location is a retail store.

17. The computer implemented method of claim 13, wherein the pick-up location is a third party entity location.

* * * * *